Feb. 3. 1925.  
A. WAGENBACH  
JAWS FOR SHEARS  
Filed June 7, 1924
1,524,723
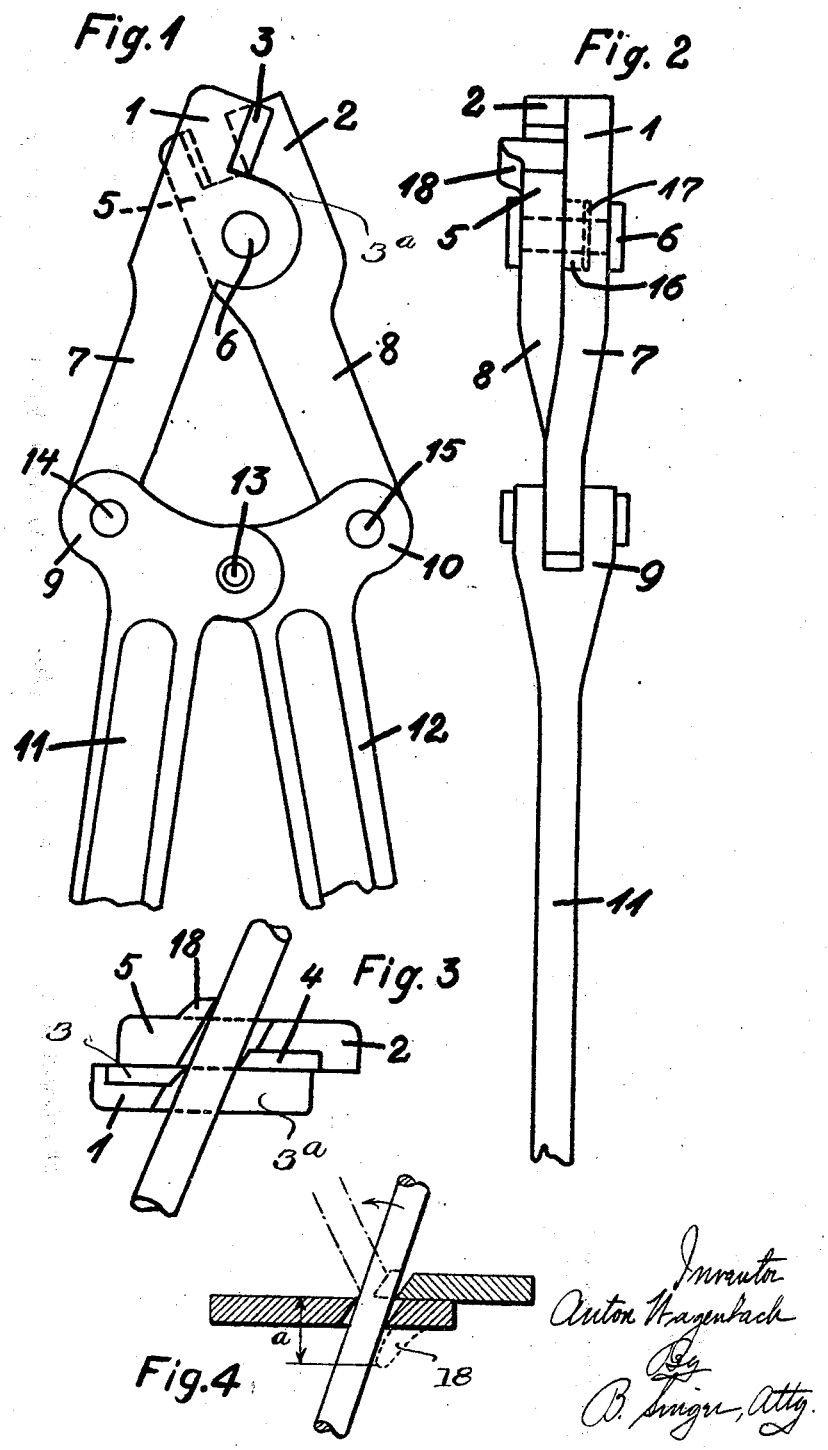

Patented Feb. 3, 1925.

UNITED STATES PATENT OFFICE.

ANTON WAGENBACH, OF ELBERFELD, GERMANY.

JAWS FOR SHEARS.

Application filed June 7, 1924. Serial No. 718,549.

*To all whom it may concern:*

Be it known I, ANTON WAGENBACH, manufacturer, citizen of Germany, and resident of Elberfeld, Germany, Bachstr. 67, have invented certain new and useful Improvements in Jaws for Shears, for which I have applied for patent in Germany, filed June 17, 1922; and I do hereby declare that the following is a full, clear, and exact specification, reference being had therein to the accompanying drawing.

It is well known to provide shears with jaws which by oblique faces hold the iron to be cut in an oblique direction, so that the jaws in sliding by the side of each other are not liable to jam, and proper cutting by small force is ensured. Contrarily, the known shears, in which short jaws are linked to long arms or levers to be handled by both arms of a man, are commonly provided with wedge-shaped knives the cutting edges of which are centrally pressed against each other, so that no jamming occurs, but a great amount of force is used with these shears and the wear and tear of the knives is very remarkable.

The invention consists in utilizing the first-mentioned shear construction for shears of the second-mentioned type by providing two jaws linked together, the one jaw being formed as a mouth having faces parallel to the foremost face of the knife, and both jaws having short arms with cross-borings fitting to the usual long handle levers. With these new shears it is possible to cut heavy rolled iron by very light shears without any jamming of the knives, and these may be easily replaced after long use.

Further details of the invention are described below.

The invention is shown in the accompanying drawing, in which—

Fig. 1 is a side view,

Fig. 2 is an edge view, and

Fig. 3 is a partial top view.

Fig. 4 is a diagram illustrating the operation of the invention.

Two jaws 1, 2 fitted with exchangeable knives 3, 4 are arranged to slide by the side of each other. The jaw 1 is formed with a clearance space 3ª. The jaws have their edge faces substantialy parallel to the oblique foremost faces of the knives, and the one jaw 2 is completed by a counter face or auxiliary face 5 to a mouth, the said counter face being also parallel to the first named oblique face. This mouth is adapted to hold the irons to be cut in different oblique directions according to their size thus causing the jaws to be pressed against each other by the cutting forces and pushing asunder of the jaws to be obviated; thereby proper and light cutting is attained and the shears are very durable.

The jaws 1, 2 are united by a pivot 6 and have driving arms 7, 8 by which they can be attached to the eyes 9, 10 of the levers 11, 12 of commonly known handle shears. In the shown sample the arms or levers 11, 12 are linked together by a pivot 13, but this may be replaced by other known constructions, such as links or the like, without deviating from the invention. In the eyes 9, 10 the driving arms 7, 8 are held by bolts 14, 15, so that a movement of the levers 11, 12 towards each other causes the driving arms 7, 8 to be removed from each other and the jaws 1, 2 to be approached to each other.

The driving arms, for fitting to the eyes of usual shears in spite of their position in different planes, are curved, as may be seen from Fig. 2, in such manner that their ends extend in a common middle plane. The pivot 6, for transmitting all forces near to said middle plane, is completed by an annular projection 16 of the jaw 2 and a corresponding excavation 17 of the jaw 1; thus the pivot bolt 6 is completely released from cross forces and only under tension load, and jamming of the jaws is obviated also in this respect.

The one arm 5 of the cutting mouth is provided with a sidewardly directed projection 18 enlarging the oblique auxiliary face which is opposed to the knife 4. Hereby the iron to be cut is held especially sure, so that proper cutting is attained without making the other parts of the jaws remarkably thick. With reference to the lug extension 18, attention is called to Fig. 4 of the drawings from which it will appear that the lug produces an especially good hold on the blank, thereby assuring a very clean cut. The said lug increases the holding effect without excessively increasing the weight.

I claim:

1. Jaws for shears comprising, in combination, two jaws pivoted together and arranged to move in different planes, said jaws having driving arms curved into the common middle plane and eyes at the ends of said driving arms, one of said jaws having a cutting knife presenting a beveled cutting edge, said jaw having a clearance space opposite the cutting edge of said knife, the other jaw having a notch open at the outer end of said jaw, a cutting knife at one side of said notch, also presenting a beveled cutting edge and arranged opposite the first named knife and at one side of said notch, the other side of said notch corresponding with the knifed side of the first named jaw and forming a beveled counterface, and also having a laterally extending projection forming an extension of said beveled counterface.

2. Jaws for shears comprising, in combination, two jaws pivoted together and arranged to move in different planes, said jaws having driving arms curved into the common middle plane and eyes at the ends of said driving arms, one of said jaws having a cutting knife presenting a beveled cutting edge, said jaw having a clearance space opposite the cutting edge of said knife, the other jaw having a notch open at the outer end of said jaw, a cutting knife at one side of said notch, also presenting a beveled cutting edge and arranged opposite the first named knife and at one side of said notch, the other side of said notch corresponding with the knifed side of the first named jaw and forming a beveled counterface, and also having a laterally extending projection forming an extension of said beveled counterface, and a pair of levers pivotally connected together and respectively pivotally connected to said driving arms of the jaws.

In witness whereof I affix my signature.

ANTON WAGENBACH.